(12) United States Patent
Ozawa

(10) Patent No.: US 6,719,270 B2
(45) Date of Patent: Apr. 13, 2004

(54) PLUG FOR FLUID PIPE CONNECTOR

(75) Inventor: Toshihiko Ozawa, Gyoda (JP)

(73) Assignee: Surpass Industry Co., Ltd. (JP)

( * ) Notice: Subject to any disclaimer, the term of this patent is extended or adjusted under 35 U.S.C. 154(b) by 176 days.

(21) Appl. No.: 09/969,729

(22) Filed: Oct. 4, 2001

(65) Prior Publication Data
US 2002/0050296 A1 May 2, 2002

(30) Foreign Application Priority Data

Oct. 26, 2000 (JP) ....................................... 2000-326764

(51) Int. Cl.[7] ................................................ F16L 37/32
(52) U.S. Cl. .................... 251/149; 137/614.04; 285/308
(58) Field of Search .......................... 251/149.1, 149.6; 137/614.04, 614.03, 614.05; 285/307, 308

(56) References Cited

U.S. PATENT DOCUMENTS 2,966,371 A * 12/1960 Bruning ............. 137/614.04 X
6,302,148 B1 * 10/2001 Imai ...................... 137/614.04

FOREIGN PATENT DOCUMENTS

JP  2000-230686  8/2000

* cited by examiner

Primary Examiner—Kevin Lee
(74) Attorney, Agent, or Firm—Lorusso, Loud & Kelly

(57) ABSTRACT

There is provided a plug 13 for a fluid pipe connector 11 for connecting fluid pipes to each other or for connecting a fluid pipe to a storage tank or a processing unit. The plug 13 includes a plug portion 6, a fixing portion 78 for sandwiching a flange 87 of a pipe between itself and the end face of the plug portion 61 to fix and support the flange 87, a cylindrical support 80 which is integrally formed with the fixing portion 78 for supporting the pipe 60, and a fixing nut for covering and fixing the plug portion 61 and the fixing portion 78. Between the fixing portion 78 and the remainder of the cylindrical support 80 is provided an engagement surface 79 for a lock lever 52. On the distal end of the plug portion 61, is provided a valve 62 for engaging a valve 20 of a member which is to be connected to the plug 13, to establish a fluid communication. On the outer peripheral surface of the fixing nut 64, a long groove 83 is provided for properly aligning the plug 13. Thus, it is possible to reduce the size and weight of a plug for a fluid pipe connector, and to improve safety.

13 Claims, 9 Drawing Sheets

PLUG FOR FLUID PIPE CONNECTOR

CROSS-REFERENCE TO RELATED APPLICATION

This application claims, under 35 USC 119, priority of Japanese Application No. 2000-326764 filed Oct. 26, 2000.

BACKGROUND OF THE INVENTION

1. Field of the Invention

The present invention relates to a plug for a fluid pipe connector, which is used for connecting fluid pipes to each other or for connecting a fluid pipe to a storage tank, a processing unit or the like.

2. Description of the Prior Art

Fluid pipe connectors for connecting a fluid pipe for flow of chemicals to a storage tank, a processing unit or the like, generally have a flange structure. As shown in FIG. 2, such a fluid pipe connector 1 comprises, on one side, a connecting portion 3 which is provided on an end portion of a fluid pipe 2 on the side of a storage tank, and a connecting portion 5 on the other side which is provided on a plug body 4. The one side connecting portion 3 and the other side connecting portion 5 are provided with fixing flanges 6 and 7, respectively. The fixing flanges 6 and 7 are fixed to each other by means of bolts 8, so that the fluid pipe 2 is connected to the plug body 4.

In order to carry chemicals safely, the fluid pipe 2 comprises an inner tube, an intermediate tube and an outer tube, wherein the outer tube is formed of stainless steel. Accordingly, the fluid pipe 2 has a considerably heavy weight.

Because the fluid pipe 2 is heavy, the connection of the one side connecting portion 3 to the other side connecting portion 5 tends to loosen. That is, there is a problem in that the weight of the fluid pipe 2 tends to force the upper sides of the fixing flanges 6 and 7 apart, to loosen the connection.

SUMMARY OF THE INVENTION

It is therefore an object of the present invention to eliminate the aforementioned problems and to provide a plug for a fluid pipe connector, which plug is capable of supporting a heavy fluid pipe in a manner providing a secure connection of the fluid pipe to another fluid pipe, a storage tank, a processing unit or the like.

In order to accomplish the aforementioned and other objects, according to one aspect of the present invention, there is provided a plug for a fluid pipe connector for connecting fluid pipes to each other or for connecting a fluid pipe to a storage tank or a processing unit, the plug comprising: a plug portion, the rear portion of which is fixed and the front of which is open for discharge of a liquid; a fixed plate which is formed as a flange on an end of a fluid pipe; a fixing portion for sandwiching the fixed plate portion between the fixing portion and a base end portion of the plug portion to fix and support the fixed plate portion; a cylindrical supporting portion which is integrally provided on the fixing portion for loosely supporting the fluid pipe; and a fixing nut for covering and fixing the plug portion and the fixing portion.

Since the plug portion and the fixing portion are fixed and covered by the fixing nut, the plug for fluid pipe connector can be miniaturized and easily handled. In addition, since the fluid pipe is loosely supported on the cylindrical supporting portion, the fluid pipe does not bend at an acute angle. Moreover, the fluid pipe is supported on the cylindrical supporting portion to prevent the fluid pipe from greatly canting at the connection of the fixed plate portion which is sandwiched between the plug portion and the cylindrical portion, so that it is possible to reliably prevent this portion from canting.

The plug for a fluid pipe connector is preferably provided with longitudinal sections of different outer diameters to provide an engagement surface for a locking mechanism in the form of an annular shoulder therebetween.

With this construction, the locking mechanism can reliably engage the outer periphery of the plug, so that it is possible to reliably fix the plug to the mating portion of the fluid pipe connector.

The plug further comprises a valve at its distal end, the valve opening to establish fluid communication when the valve is pushed into a member to be fixed thereto. With this construction, the plug portion is not open unless the valve contacts and pushes against the member which is to be connected thereto. Thus, safety in handling is improved.

The plug preferably further comprises a longitudinal groove for preventing the plug from being erroneously mounted, the long groove being formed in the outer peripheral surface of the fixing nut. With this construction, the plug of the fluid pipe connector can not be inserted into a member which is to be connected thereto, unless the long groove is aligned with the member which is to be connected thereto, thereby preventing improper mounting.

An enlarged diameter portion to be engaged by the fixing nut is preferably formed on the base end of the plug portion. With this construction, the fixing nut engages the enlarged diameter portion of the base end portion of the plug portion to fix the plug portion to the cylindrical portion.

An O-ring for sealing a fluid passage is preferably provided on an end face of the enlarged diameter portion. With this construction, the fluid passage is surely sealed by the O-ring when the plug is fixed.

The plug preferably further comprises a locking nut which pressingly contacts the fixing nut for preventing the fixing nut from rotating and thereby loosening. With this construction, the locking nut surely prevents the loosening of the fixing nut.

An annular groove, for engagement by a locking mechanism to be fixed, is preferably formed in and around the outer periphery of a central portion of the plug portion.

The plug portion is preferably cylindrical, the distal end of the plug portion being provided with an opening, and preferably includes a valve for opening and closing the opening. With this construction, fluid communication through the opening at the distal end of the plug is open and closed by the valve.

The valve for opening and closing the plug opening is preferably provided with a communication hole which establishes fluid communication when spaced from a valve seat in the plug, and with an opening and closing protrusion for pushing a member, which is to be connected to the plug, to separate the valve from the seat valve. With this construction, the opening and closing protrusion of the valve pushes the member, which is to be connected to the plug, to separate the valve from the seat valve, and in this state, fluid communication is established through the communication hole.

According to another aspect of the present invention, there is provided a plug for a fluid pipe connector for connecting fluid pipes to each other or for connecting a fluid pipe to a storage tank or a processing unit, the plug comprising: a plug portion which is fixed at one end and opens at an opposite, distal end from which a liquid is discharged, the plug portion having a thread around its outer periphery. A fixed plate is formed as a flange of a fluid pipe. A fixing element with internal threads is screwed onto the plug portion for sandwiching the fixed plate between a fixing portion and an end face of the plug portion. A cylindrical support is integrally formed with the fixing portion for supporting the fluid pipe. With this construction, the fixing element is screwed onto the thread of the plug portion to fix the fixed plate of the fluid pipe, so that it is possible to decrease the number of parts and the outside diameter of the plug for fluid pipe connector.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENTS

Referring now to the accompanying drawings, preferred embodiments of a plug for a fluid pipe connector according to the present invention will be described below.

First Preferred Embodiment

Referring to FIGS. 1 and 3 through 10, the first preferred embodiment of a plug for a fluid pipe connector according to the present invention will be described below.

A fluid pipe connector 11 is a member for connecting fluid pipes to each other or for connecting a fluid pipe to a storage tank, a processing unit or the like. The fluid pipe connector 11 mainly comprises a female side connecting portion 12, and a plug 13 serving as a male side connecting portion.

Figure 3:
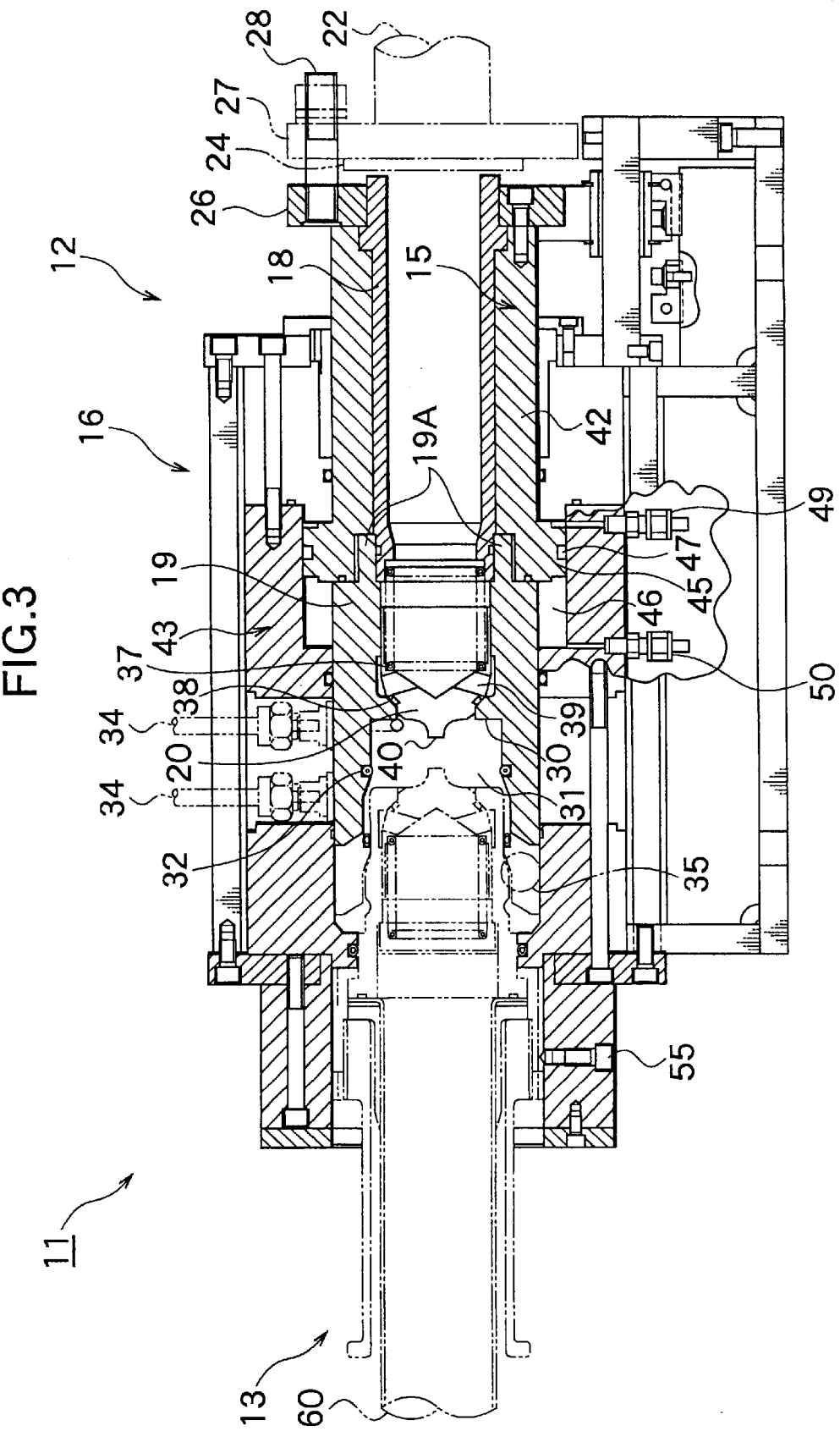
FIG. 3 is a front sectional view showing a female side connecting portion in the first preferred embodiment of the present invention.
Figure 4:
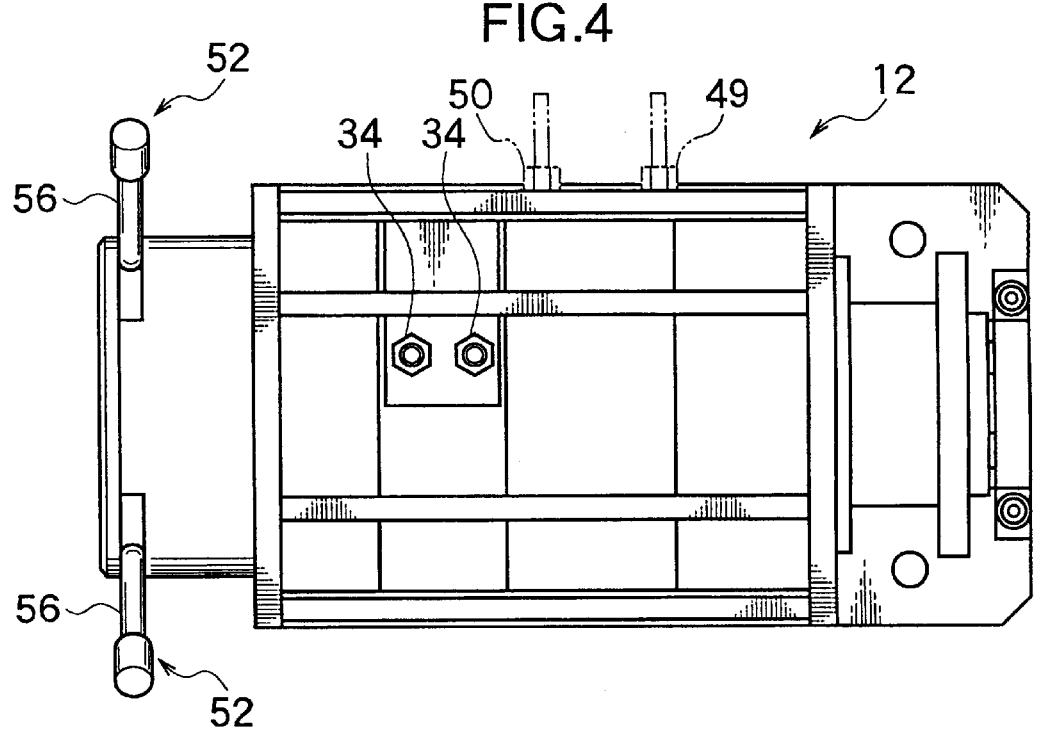
FIG. 4 is a plan view showing the female side connecting portion in the first preferred embodiment of the present invention.
Figure 5:
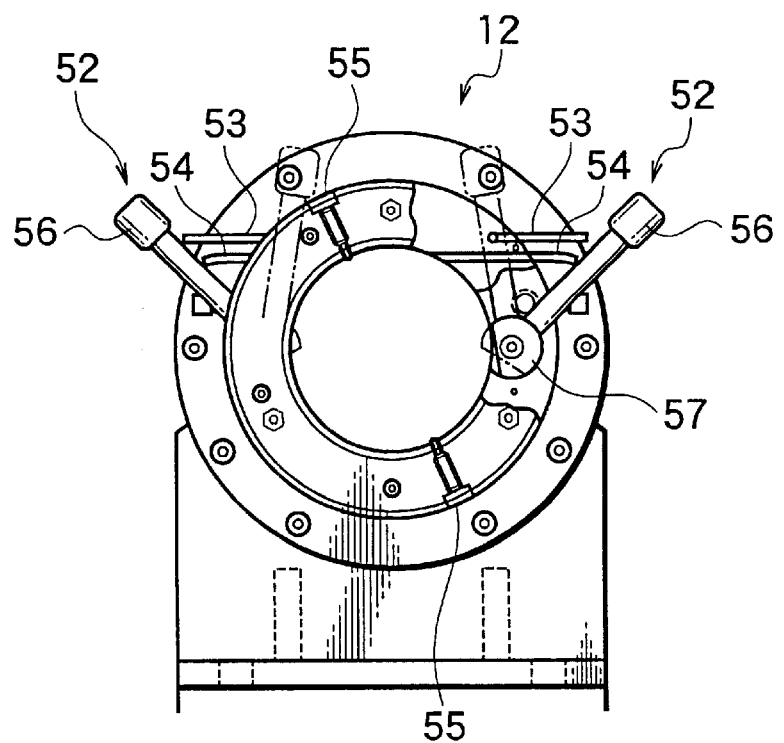
FIG. 5 is a left side view showing the female side connecting portion in the first preferred embodiment of the present invention.

As shown in FIGS. 3 through 5, the female side connecting portion 12 mainly comprises a female side plug portion 15 and a housing 16.

The female side plug portion 15 mainly comprises an inner pipe 18, a shower ring 19 and a valve 20.

The inner pipe 18 is a member for connecting an external pipe 22 to the shower ring 19. The inner pipe 18 is mounted in a slider portion 42 which will be described later. The base end (the right side end in FIG. 4) of the inner pipe 18 is connected to the external pipe 22, and the other end of inner pipe 18 is connected to the shower ring 19. The external pipe 22 is one of the fluid pipes which are connected to each other by the connector, or is a fluid pipe connected to a storage tank or processing unit. The end of the external pipe 22 is provided with a piping side flange 24. This piping side flange 24 is clamped between a fixing flange 26, on the side of the inner pipe 18, and a presser plate 27 and is fixed by means of bolt 28, so that the external pipe 22 is connected to the inner pipe 18.

The shower ring 19 serves as a fitting for receiving the plug 13. The whole shower ring 19 is substantially cylindrical. A base end side of the shower ring 19 serves as a part of a fluid passage of the female connecting portion 12. A valve seat 30 for the valve 20 is centrally formed within the shower ring 19. One end side of the shower ring 19 serves as a cylindrical fitting portion 31 into which an end portion of the plug 13 is fitted. The inside shape of the cylindrical fitting portion 31 is the same shape as that of the distal end portion of the plug 13. An O-ring 32 is mounted on the inside surface of the cylindrical fitting portion 31. The O-ring 32 forms a seal around the distal end portion of the plug 13 when the plug 13 is fitted into the cylindrical fitting portion 31. The base end of the shower ring 19 is provided with a threaded portion 19A. This threaded portion 19A is screwed into the slider portion 42, whereby the shower ring 19 is connected to the slider portion 42.

Moreover, a cleaning pipe 34 is connected to the cylindrical fitting portion 31 of the shower ring 19. This cleaning pipe 34 is for cleaning the valves 20 and 62 of the female side connecting portion 12 and plug 13 for fluid pipe connector. That is, before the plug 13 is completely inserted into the female side connecting portion 12, pure water or cleaning chemicals are jetted from the cleaning pipe 34 into the valves 20 and 62 of the female side connecting portion 12 and plug 13 to clean the end portions of the female side connecting portion 12 and the plug 13. After cleaning, pure water or the like is discharged from a drain pipe 35 which is provided in a cylinder portion 43 of the housing 16.

The valve 20 opens and closes the distal end of the fluid passage of the female side connecting portion 12. This valve 20 has a dish shape and is biased against on the valve seat 30 of the shower ring 19 by a spring 37. On the surface of the valve 20 contacting the valve seat 30, an O-ring 38 is provided for sealing a gap between the shower ring 19 and the valve seat 30. Inside of the valve 20, adjacent to the O-ring 38, are provided a plurality of communication holes 39. When the valve 20 is spaced from the valve seat 30, the communication holes 39 allow flow of chemicals or the like, so that a fluid communication is established between the female side connecting portion 12 and the plug 13. The distal end of the valve 20 is formed with an opening and closing protrusion 40. This protrusion 40 contacts an opening and closing protrusion 76 of the plug 13, which will be described later. When the opening and closing protrusions 40 and 76 contact, the valve 20 is pushed away from the valve seat 30 and the valve 20 is thereby opened. The same action occurs in the plug 13, so that fluid communication is established between the female connecting portion 12 and the plug 13.

The housing 16 supports the female side plug portion 15 and the fitted plug 13. This housing 16 comprises the slider portion 42 and the cylinder portion 43.

The slider portion 42 is reciprocably mounted within the cylinder portion 43. The inner pipe 18 and one end of the shower ring 19 of the female side plug portion 15 are mounted within the slider portion 42. Thus, the inner pipe 18 and the shower ring 19 reciprocate with the reciprocating motion of the slider portion 42, so that the female side connecting portion 12 and the plug 13 are completely connected to or disconnected from each other. When completely connected the valves 20 and 62 are open to establish fluid communication through the female side connecting portion 12 and plug 13.

The tip end of the slider portion 42 is formed with a piston portion 45. This piston portion 45 reciprocates within a space 46 in the cylinder portion 43, which will be described later.

The cylinder portion 43 is a member for reciprocably supporting the slider portion 42 and the shower ring 19 and for directly supporting and fixing the plug 13. The outside diameter of the slider portion 42 is set to be equal to the outside diameter of the shower ring 19, and the inside diameter of the full length of the cylinder portion 43 is set to be equal to the outside diameter of the slider portion 42 and so forth. Thus, the slider portion 42 and so forth are capable of reciprocating in the cylinder portion 43. Furthermore, the inside diameter of the cylinder portion 43 is enlarged in the vicinity of the center thereof to form the space 46. The piston portion 45 is inserted into the space 46 for lateral reciprocating motion. Air pressure supply pipes 49 and 50 are connected at opposing ends of the space 46. Air pressure is selectively supplied from the air pressure supply pipes 49 and 50, so that the piston portion 45 is moved to the right or left. By the movement of the piston portion 45, the female side connecting portion 12 is completely connected to or disconnected from the plug 13. Furthermore, an O-ring 47 is provided on the outer periphery of the piston portion 45 to seal a gap between the outer peripheral surface of the piston portion 45 and the inner peripheral surface of the space 46.

One end portion (the left end portion in FIG. 3) of the cylinder portion 43 is provided with a lock lever 52, a lock lever sensor 53, a plug sensor 54 and key bolts 55 (see FIGS. 4 and 5).

The lock lever 52 is a lock mechanism for fixing the plug 13 to the female connecting portion 12. This lock lever 52 comprises a lever 56 which is to be manually rotated by an operator, and a substantially semi-circular engaging piece 57 which is rotated by the lever portion 56 for engaging or releasing an engagement surface 79 (see FIG. 1) of the plug 13, which will be described later.

The lock lever sensor 53 is a sensor for detecting whether the plug 13 has been fixed to the female side connecting portion 12 by means of the lock lever 12. This lock lever sensor 53 comprises an optical sensor or the like for detecting the presence of the lever 56 of the lock lever 52 when the lever 56 is in a locked state (a state shown by imaginary lines in FIG. 5).

The plug sensor 54 is a sensor for detecting whether the plug 13 has been mounted in the female side connecting portion 12. This plug sensor 54 comprises an optical sensor or the like for detecting the presence of the plug 13 when the plug 13 is mounted in the female side connecting portion 12.

The key bolt 55 is designed to be fitted into a long groove 83 of the plug 13 (see FIG. 8), which will be described later, for allowing the plug 13 to be inserted into the female side connecting portion 12. A key bolt 55 is provided for each of a plurality of bolt holes. The mounting positions and number of the key bolts 55 are suitably set in accordance with the type of the chemicals or the like. Thus, the plug 13 can not be inserted into the female side connecting portion 12 unless the key bolt 55 is aligned with the long groove 83, thereby preventing an improper connection.

Figure 1:
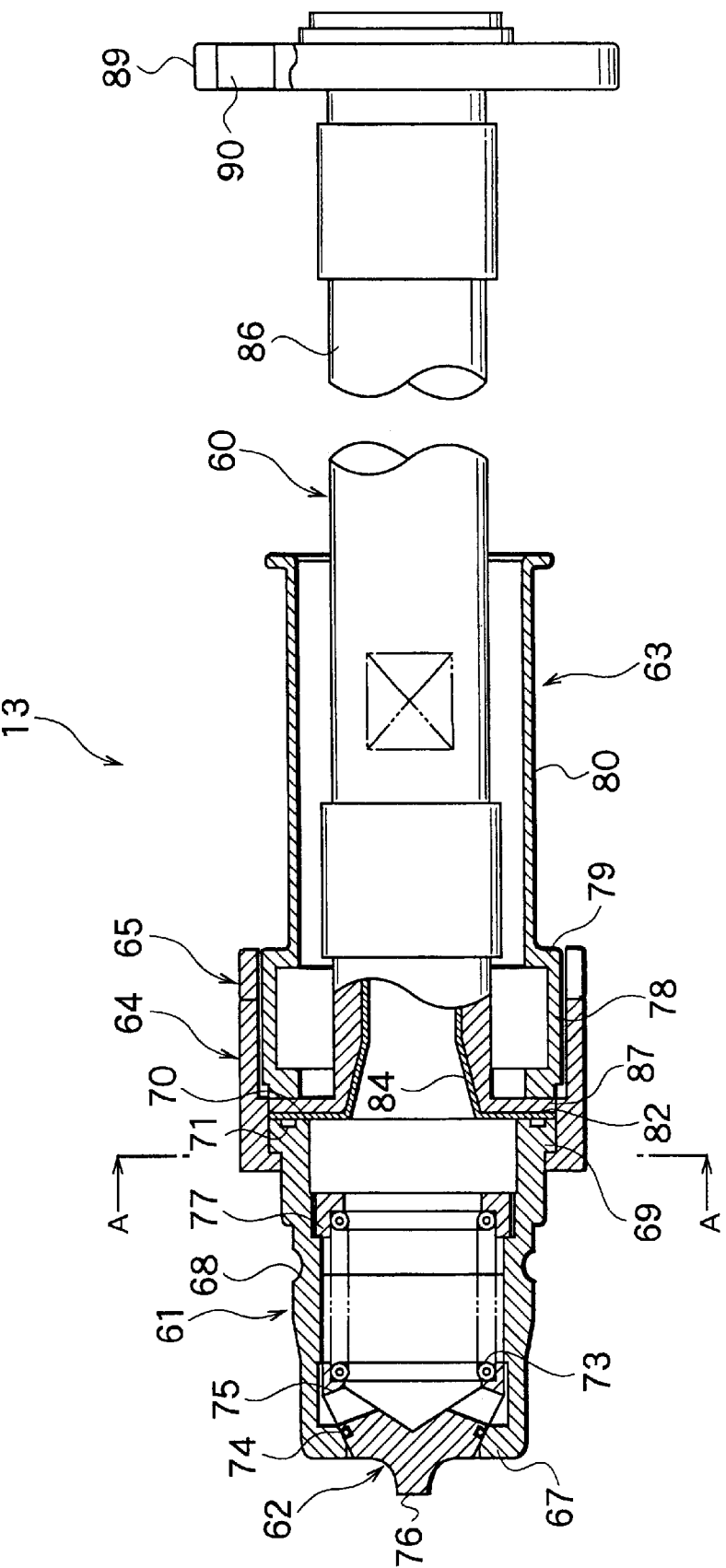
FIG. 1 is a front sectional view of the first preferred embodiment of a plug for a fluid pipe connector according to the present invention.
Figure 2:
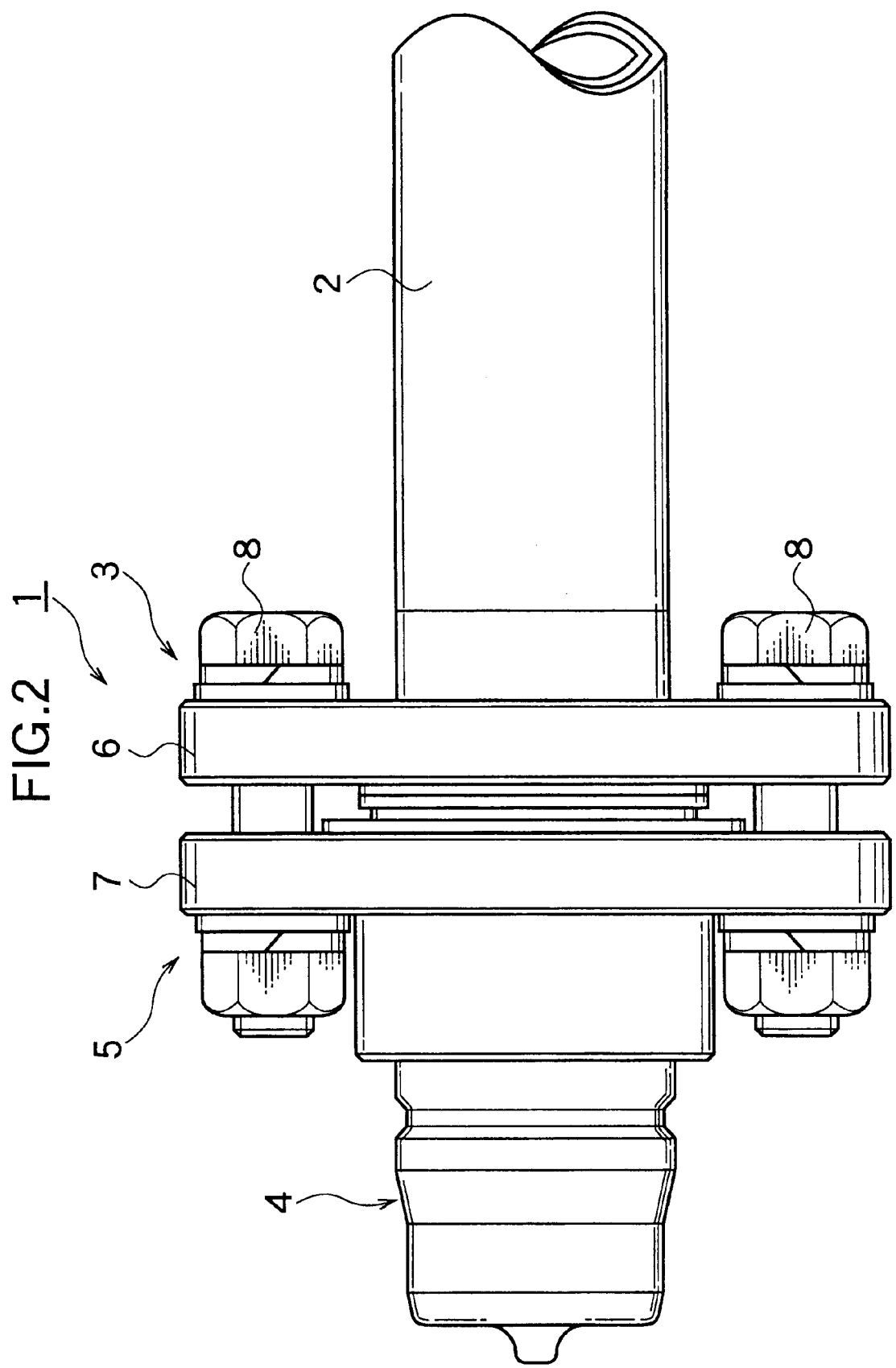
FIG. 2 is a front view of a conventional plug for a fluid pipe connector.

The plug 13 is mounted on the end a fluid pipe 60 to be fitted into the female side connecting portion 12. As shown in FIG. 1, this plug 13 comprises a plug portion 61, a valve 62, a pipe supporting portion 63, a fixing nut 64 and a locking nut 65.

Figure 6:
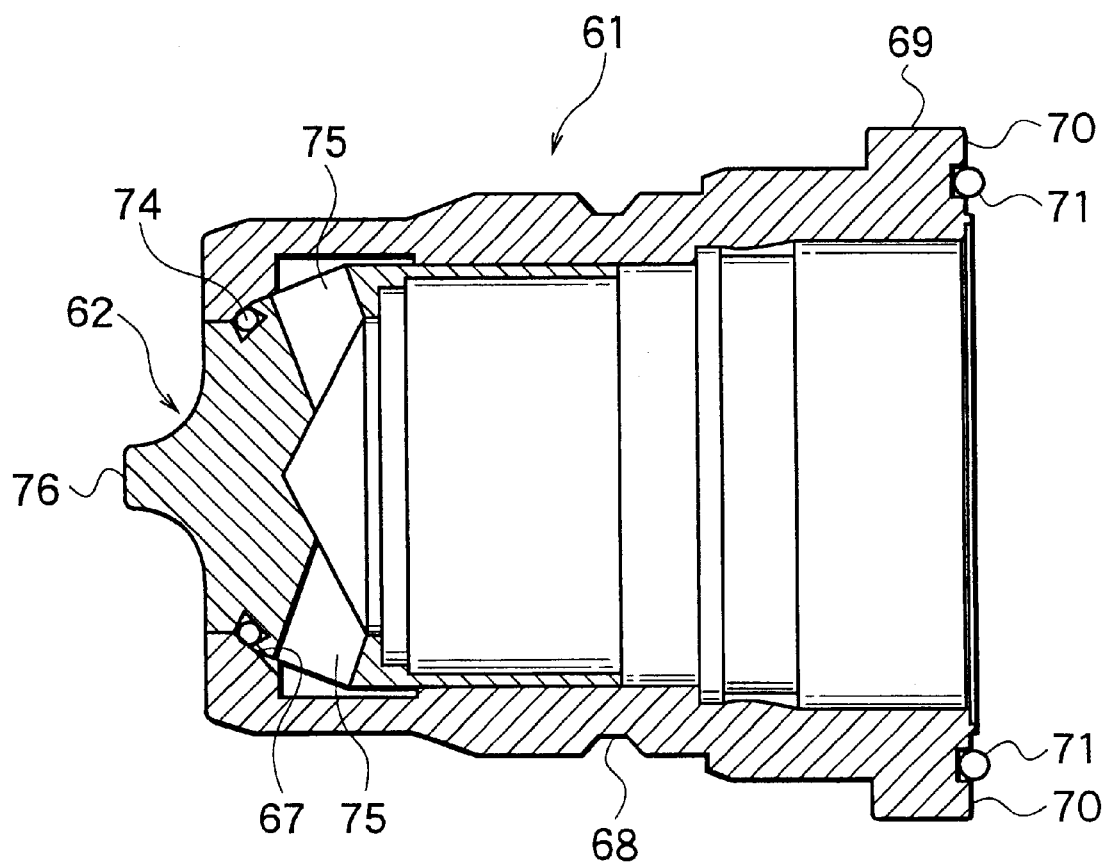
FIG. 6 is a front sectional view showing a plug portion of the plug in the first preferred embodiment of the present invention.

The plug portion 61 is inserted directly into the shower ring 19 of the female side connecting portion 12 for connecting the plug 13 to the female side connecting portion 12. As shown in FIGS. 1 and 6, this plug portion 61 is substantially cylindrical, and has a valve seat 67 of the valve 62 formed on its distal end. Around the outer periphery of the longitudinal center portion of the plug portion 61 is formed an annular groove 68 which is engaged by the locking mechanism. On the base end of the plug portion 61 is formed an enlarged diameter (flared) portion 69 for engaging the fixing nut 64. An O-ring 71 for sealing a fluid passage is provided on the end face (the right end face in the figure) 70 of the enlarged diameter portion 69.

The valve 62 serves to open and close the opening in the distal end of the plug 61. This valve 62 has a dish shape, and is biased against the valve seat 67 of the plug portion 61 by means of a spring 73. A seal between the contacting surfaces of the valve 62 and the valve seat 67 is provided by an O-ring 74. Laterally inside of the O-ring 74 of the valve 62, are provided a plurality of communication holes 75. When the valve 62 is spaced from the valve seat 67, the communication holes 75 allow flow of the chemicals or the like, so that fluid communication is established between the female side connecting portion 12 and the plug 13. The tip end of the valve 62 is formed with an opening and closing protrusion 40 for engaging the opening and closing protrusion 40 of the valve 20 of the female side connecting portion 12 to cause the valve 62 to unseat from the valve seat 67. A stopper 77 is provided for supporting the base end portion of the spring 73.

Figure 7:
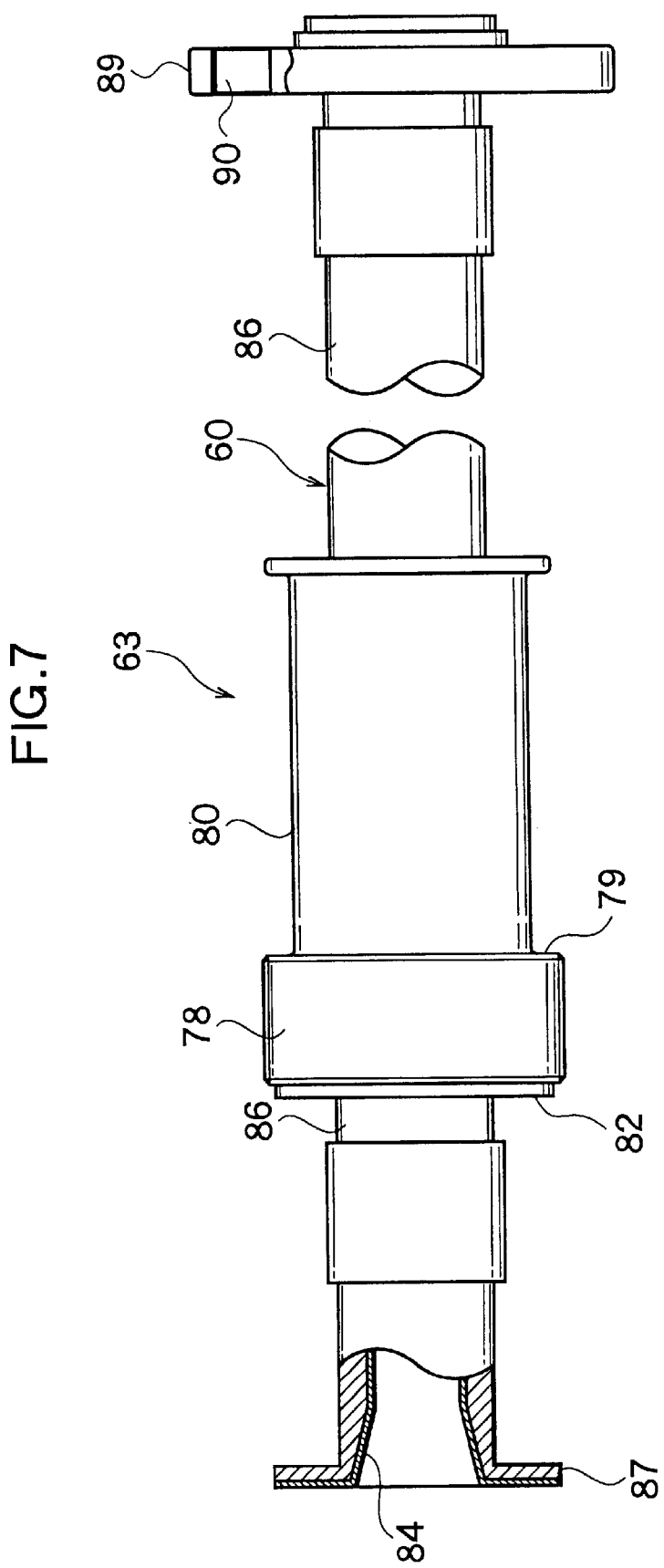
FIG. 7 is a front view showing a fluid pipe and a pipe supporting portion of the plug in the first preferred embodiment of the present invention.
Figure 8:
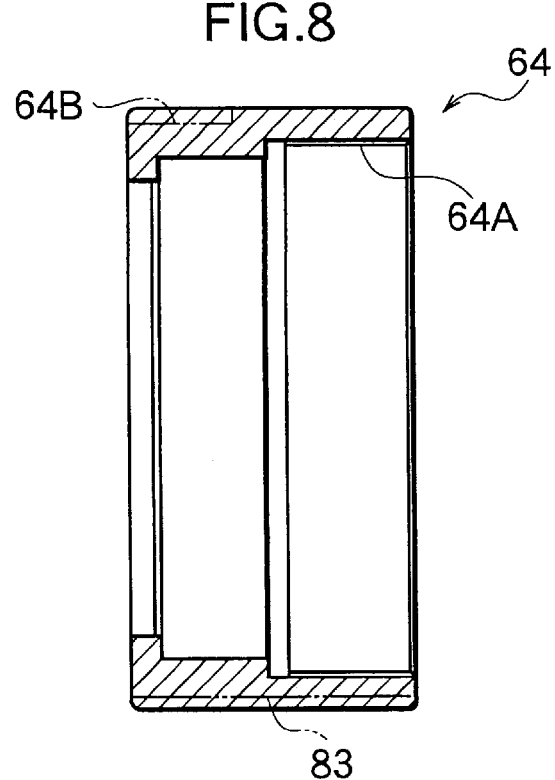
FIG. 8 is a front sectional view showing a fixing nut of the plug in the first preferred embodiment of the present invention.
Figure 9:
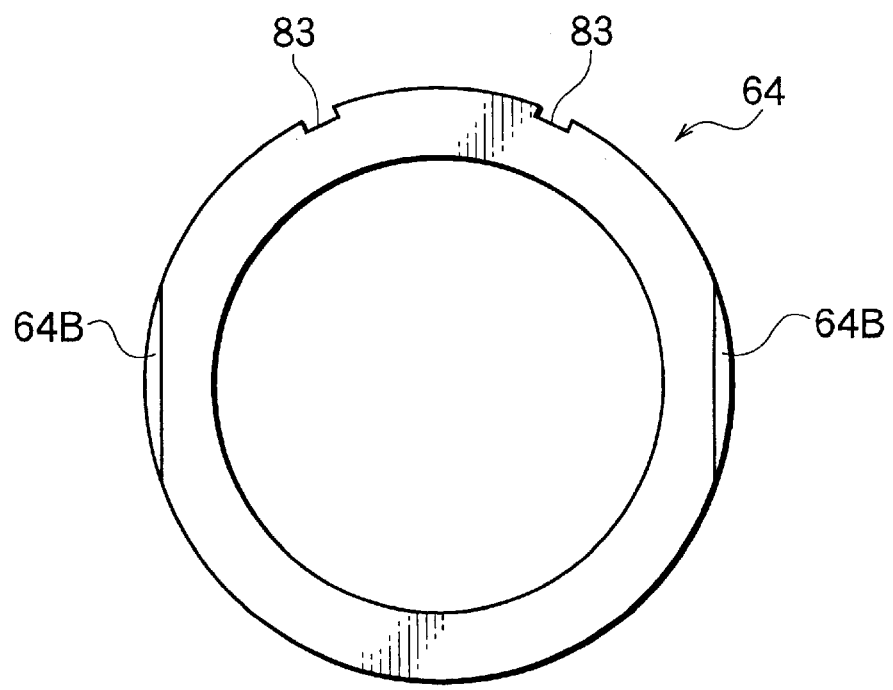
FIG. 9 is a side view showing the fixing nut of the plug in the first preferred embodiment of the present invention.
Figure 10:
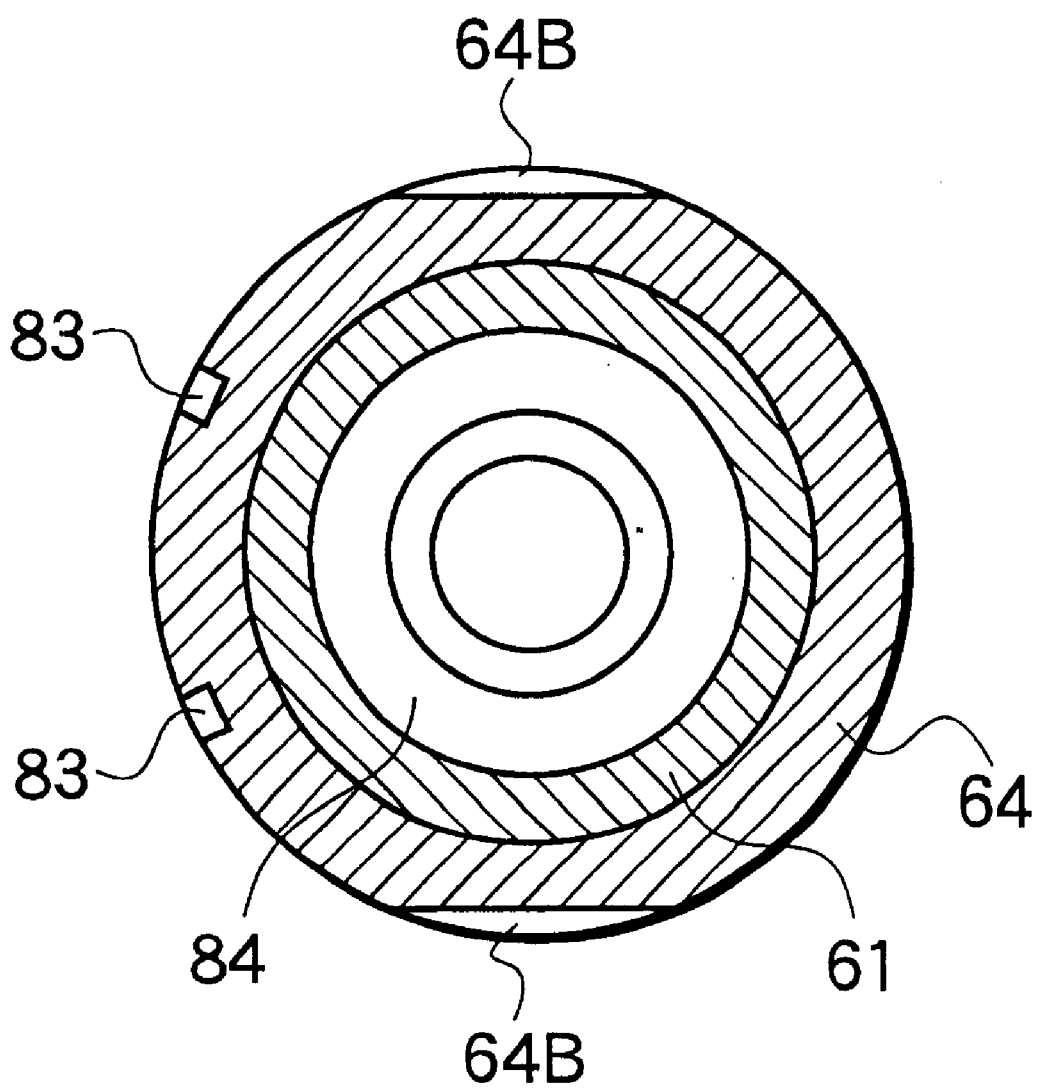
FIG. 10 is a sectional view taken along line A—A of FIG. 1.

The pipe supporting portion 63 supports the end portion of the fluid pipe 60 over a predetermined distance (e.g., about 10 cm) from the distal end of pipe 60. As shown in FIGS. 1 and 7, this pipe supporting portion 63 comprises a fixing portion 78, an engagement surface 79, and a cylindrical supporting portion 80.

The fixing portion 78 has an outside diameter corresponding to the inside diameter of the fixing nut 64 and the locking nut 65. A thread is formed around the outer periphery of the fixing portion 78. The fixing nut 64 and the locking nut 65 are designed to be screwed onto the thread of the fixing portion 78. The distal end (the left end in the figure) of the fixing portion 78 has a fixing face 82. This fixing face 82 is formed so as to allow the diameter of the distal end of the fixing portion 78 to be decreased, and cooperates with the end face 70 of the plug portion 61 to sandwich the end portion of the fluid pipe 60 therebetween.

The engagement surface 79 is engaged by the engaging piece 57 of the lock lever 52 for fixing the plug 13 to the female side connecting portion 12. This engagement surface 79 is formed as an annular shoulder between the large diameter fixing portion 78 and the small diameter cylindrical supporting portion 80.

The cylindrical supporting portion 80 serves to support the fluid pipe 60. If the distal end of the fluid pipe 60 was to be supported only by being sandwiched between the end face 70 of the plug portion 61 and the fixing face 82 of the fixing portion 78, it would be easily loosened when the fluid pipe 60 cants due to its weight. In order to prevent this, the cylindrical supporting portion 80 supports a length of the fluid pipe 60 extending about 10 cm from its distal tip. Thus, with the fluid pipe 60 supported on the cylindrical supporting portion 80, the distal end of the fluid pipe 60 can hardly cant, so that the connection between the end face 70 and the fixing face 82 is prevented from loosening. This cylindrical supporting portion 80 comprises a cylinder having an inside diameter which is slightly larger than the outside diameter of the fluid pipe 60. Thus, a play is allowed between the cylindrical supporting portion 80 and the fluid pipe 60. By this play, the fluid pipe 60 does not bend at an acute angle. Moreover, the cylindrical supporting portion 80 serves as a holder for the operator's hand.

The fixing nut 64 fixes the plug portion 61 to the pipe supporting portion 63. As shown in FIGS. 1 and 8 through 10, a thread groove 64A for engaging the thread of the fixing portion 78 is formed in the inside surface of the fixing nut 64 on the side of the base end (the right side in the figure). The inside diameter of the fixing nut 64 on the distal end is set to be substantially equal to the outside diameter of the enlarged diameter portion 69 of the plug portion 61. One end portion of the fixing nut 64 has a smaller diameter designed to surround and support the enlarged diameter portion 69. Thus, if the base end side of the fixing nut 64 is screwed on the thread of the fixing portion 78 while the opposite end portion of the fixing nut 64 surrounds and supports the enlarged diameter portion 69, the plug portion 61 is fixed to the pipe support 63. Grooves 83 are formed in the outer peripheral surface of the fixing nut 64. The grooves 83 extend longitudinally (laterally in FIG. 1) on the fixing nut 64. The number and positions of the long grooves 83 are set in accordance with the type of the chemical or the like, so that erroneous connection is prevented. Furthermore, a flattened portion 64B is provided for clamping the fixing nut 64.

The locking nut 65 is screwed onto the thread of the fixing portion 78 to engage the fixing nut 64 and thereby prevent it from being rotated and loosened.

As shown in FIGS. 1 and 7, the fluid pipe 60 comprises an inner tube 84 of PFA, an intermediate tube 85 (see FIG. 11) of a synthetic resin, and an outer tube 86 formed of a of a stainless steel braid. The end of the fluid pipe 60 is formed with a flange 87. The flange 87 is free of the intermediate tube 85 and the outer tube 86. The inner tube 84 extends radially outward along the face of the flange 87. The flange 87 with inner tube 84 is sandwiched between the plug portion 61 and the pipe support portion 63 and thereby fixed.

The base end of the fluid pipe 60 is formed with a fixing flange portion 89. A plurality of bolt holes 90 are formed in this flange 89. The flange 89 is connected to a flange (not shown), which is formed on piping on the side of a storage tank or one of various processing units, and fixed by bolts.

With the above described construction, the operation of the fluid pipe connector 11 is as follows.

First, the plug 13 is inserted into the cylinder 43 of the female side connecting portion 12, and the lever 56 of the lock lever 52 is rotated to a locking position. Thus, the engaging piece 57 is rotated to engage the engagement surface 79 of the plug 13. In this manner, the plug 13 is fixed to the side of the female side connecting portion 12. When the plug 13 is inserted into the female side connecting portion 12, the long groove 83 is aligned with the key bolt 55. If these are not aligned with each other, the plug 13 can not be connected to the female side connecting portion 12.

Air pressure is supplied from the air pressure supply pipe 5 into the space 46, so that the shower ring 19, together with the slider portion 42, is moved toward the base end as shown by the solid line in FIG. 3. Thus, a space is formed between the valve 20 on the side of the female side connecting portion 12 and the valve 62 on the side of the plug 13.

Then, pure water is ejected from the cleaning pipe 34 to clean the plug 13 and the respective valves 20 and 62 of the female side connecting portion 12. The lock lever sensor 53 is designed to detect the lock lever 52. When the plug sensor 54 has not detected the plug 13, pure water or the like is prevented from being ejected from the cleaning pipe 34. That is, pure water is ejected only when the plug sensor 54 detects the plug 13.

Then, air pressure is supplied from the air pressure supply pipe 49 into the space 46, so that the shower ring 19 is moved to the position shown by the imaginary line in FIG. 3. Thus, the opening and closing protrusion 76 of the valve 62 on the side of the plug 13 contacts and pushes the opening and closing protrusion 40 of the valve 20 on the side of the female side connecting portion 12, so that the distal end is opened. Thus, fluid communication is established between the plug 13 and the female side connecting portion 12, so that a fluid flows therethrough to be supplied to the storage tank or processing unit, or to be collected.

At this time, the fluid pipe 60 is supported on the cylindrical support 80 of the pipe supporting portion 63. For that reason, even if the operator holds the cylindrical supporting portion 80 to take the fluid pipe 60 around during connection operation or even if the fluid pipe 60 bends due to its own weight or the weight of chemicals passing therethrough after connection, the portion of the fixed plate portion 87 hardly cants, and the end face 70 of the plug portion 61 remains fixed to the fixing face 82 of the fixing portion 78.

When the plug 13 is detached from the female side connecting portion 12, air pressure is first supplied from the air pressure supply pipe 50 into the space 46 to move the slider portion 42 to block the fluid communication between the female side connecting portion 12 and the plug 13. Then, after pure water or the like is ejected from the cleaning pipe 34 to clean liquid adhering to the valve 62 and so forth, the lever 56 of the lock lever 52 is rotated and unlocked to allow the plug 13 to be pulled out of the female side connecting portion 12.

As described above, since the plug portion 61 and the fixing portion 78 are fixed together with the fixing nut 64, the plug 13 can be miniaturized and easily handled.

In addition, since the fluid pipe 60 is supported by the cylindrical support 80 of the pipe supporting portion 63, the fluid pipe 60 does not bend at an acute angle so as to break.

Moreover, since the fluid pipe 60 is supported by the cylindrical support 80, the flange 87 of the fluid pipe 60, sandwiched between the plug portion 61 and the fixing portion 78, is prevented from canting.

Since the pipe supporting portion 63 of the plug 13 is provided with the engagement surface 79, it is possible to securely fix the plug 13 to the female side connecting portion 12.

Since the valve 62 is provided at the distal end of the plug portion 61, the plug portion 61 is not open unless the valve 62 contacts and pushes the valve 20 of the female side connecting portion 12 which is to be connected thereto, so that safety in handling is improved.

In addition, since the longitudinal groove 83 is formed in the outer peripheral surface of the fixing nut 64, the plug 13 can not be inserted into the female side connecting portion 12 unless the long groove 83 is aligned with the key bolt 55 of the female side connecting portion 12. Therefore, this plug 13 is properly mounted, so that safety in handling is improved.

Second Preferred Embodiment

Figure 11:
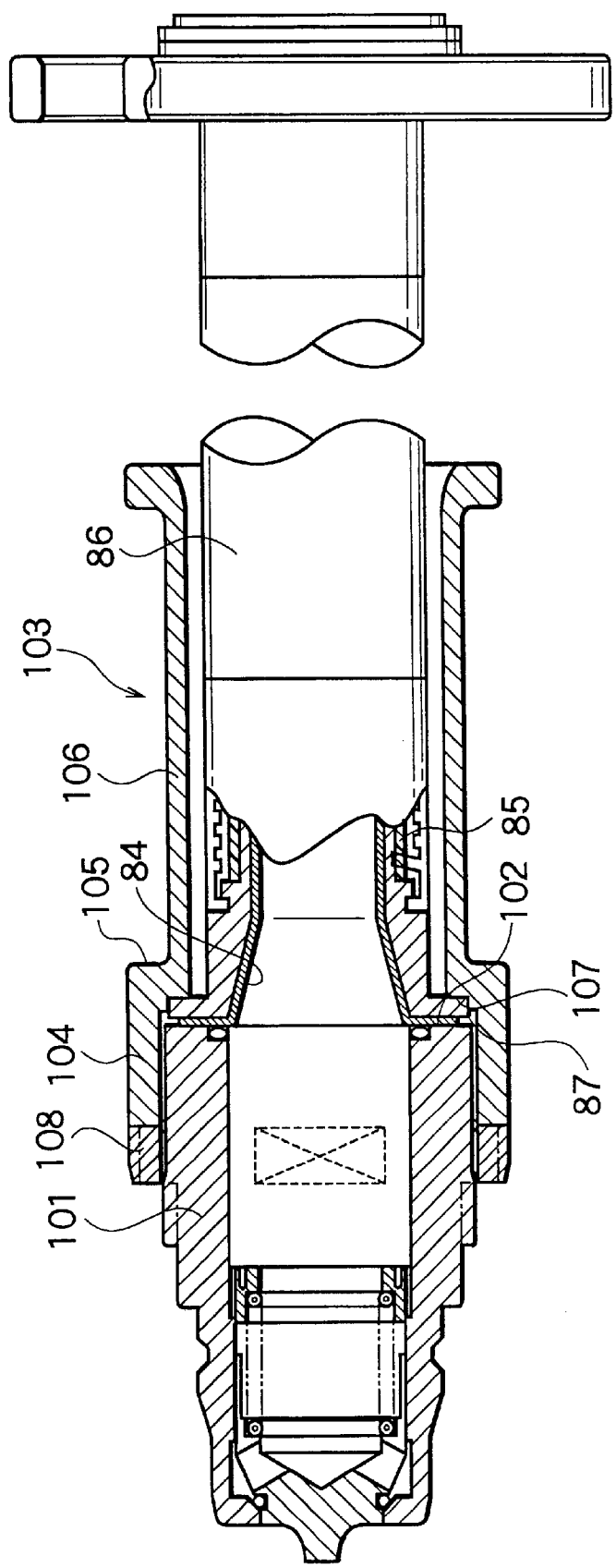
FIG. 11 is a front sectional view of the second preferred embodiment of a plug according to the present invention.

Referring to FIG. 11, the second preferred embodiment of the present invention will be described below. A plug in this second preferred embodiment is characterized in that the fixing nut 64 in the above described first preferred embodiment is omitted and a thread groove is formed directly in the pipe support 63 to decrease the number of parts. Since other features are substantially the same as those of the plug 13 in the above described first preferred embodiment, the same reference numbers are given to the same elements and the descriptions thereof are omitted.

In this preferred embodiment, a thread is formed directly on the outer periphery of the base end portion of a plug portion 101. The base end face of the plug portion 101 serves as an end face 102 for clamping and fixing flange 87.

A pipe supporting portion 103 comprises a fixing portion 104, an engagement surface 105 and a cylindrical support 106. A thread groove is formed in the interior surface of the fixing portion 104. The fixing portion 104 is screwed directly to the base end of the plug portion 101 and thereby fixed thereto. A locking nut 108 serves to prevent the fixing portion 104 from loosening.

The engagement surface 105 and the cylindrical support 106 have the same constructions as the engagement face 79 and the cylindrical support 80 in the above described first preferred embodiment.

A fixing face 107 for fixing the flange 87 to the end face of the plug 101 is formed on the reverse side of the engagement surface 105.

The plug with the above described construction is also connected to the female side connecting portion 12 in the same manner as in the above described first preferred embodiment, so that the same effects are provided.

As described above in detail, according to the present invention, the following effects are provided.

Since the plug portion and the fixing portion are covered with the fixing nut, the plug can be small and light. As a result, it is easy to handle the plug.

In addition, since the fluid pipe is supported by the cylindrical support of the pipe supporting portion, it is possible to prevent the fluid pipe from bending at an acute angle and thereby breaking.

Moreover, since the fluid pipe is supported by the cylindrical support, the fluid pipe flange, which is sandwiched between the plug portion and the fixing portion, is prevented from canting.

Since the plug is provided with the engagement surface for the locking mechanism, the locking mechanism engages the engagement surface, so that it is possible to reliably fix the plug to the female side connecting portion.

Since a valve is provided at the distal end of the plug portion, the plug portion is not open unless this valve contacts and pushes the valve of the female side connecting portion which is to be connected thereto, so that safety in handling is improved.

In addition, the plug can not be inserted into the female side connecting portion unless the long groove is aligned with the female side connecting portion. Therefore, this plug can not be erroneously mounted, so that safety in handling is improved.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A plug for a fluid pipe connector for connecting a fluid pipe having a flange to another pipe or to a storage tank or a processing unit, said plug comprising:

a plug portion having a fluid passage therethrough and an opening at a distal end thereof for discharge of liquid from the fluid passage and a base end opposite said distal end, said base end presenting a fixing face, a cylindrical supporting portion, for supporting the fluid pipe over a predetermined length thereof, said cylindrical supporting portion having a fixing portion with a fixing face at one end thereof; and a fixing nut for covering and fixing together said base end of said plug portion and said fixing portion of said cylindrical supporting portion, with the flange of the fluid pipe sandwiched between said fixing faces.

2. A plug for a fluid pipe connector as set forth in claim 1, wherein said plug portion comprises longitudinal sections of different outer diameters forming an annular shoulder therebetween at said base end, said fixing nut engaging said annular shoulder.

3. A plug for a liquid pipe connector as set forth in claim 1, wherein said plug portion comprises a valve seat surrounding said opening at said distal end and a valve member in contact with said valve seat to close said fluid passage in a closed position and spaced from said valve seat to open said fluid passage in an open position.

4. A plug for a liquid pipe connector as set forth in claim 2, wherein said plug portion comprises a valve seat surrounding said opening at said distal end and a valve member in contact with said valve seat to close said fluid passage in a closed position and spaced from said valve seat to open said fluid passage in an open position.

5. A plug for a fluid pipe connector as set forth in claim 1, further comprising a longitudinal groove in an outer peripheral surface of said fixing nut to ensure proper alignment of the plug when inserted into a mating component of the fluid pipe connector.

6. A plug for a fluid pipe connector as set forth in claim 2, further comprising a longitudinal groove in an outer peripheral surface of said fixing nut to ensure proper alignment of the plug when inserted into a mating component of the fluid pipe connector.

7. A plug for a fluid pipe connector as set forth in claim 3, further comprising a longitudinal groove in an outer peripheral surface of said fixing nut to ensure proper alignment of the plug when inserted into a mating component of the fluid pipe connector.

8. A plug for fluid pipe connector as set forth in claim 1, wherein an O-ring for sealing closed the fluid passage is provided on said fixing face of said plug portion.

9. A plug for a fluid pipe connector as set forth in claim 1, which further comprises a locking nut which contacts said fixing nut for preventing said fixing nut from rotating and thereby loosening.

10. A plug for a fluid pipe connector as set forth in claim 1, wherein an annular groove, for engagement by a locking mechanism carried by a mating portion of the fluid pipe connector, is formed around the outer periphery of said plug portion.

11. A plug for a fluid pipe connector as set forth in claim 3, wherein said plug portion is cylindrical.

12. A plug for fluid pipe connector as set forth in claim 3, wherein said valve member has a protrusion for engagement by a member carried by a mating portion of the fluid pipe connector, to separate said valve member from said seat valve.

13. A plug for a fluid pipe connector as set forth in claim 1 wherein said plug portion has a threaded outer peripheral portion and wherein said fixing nut is screwed onto said threaded portion.

* * * * *